Aug. 6, 1929.  W. R. RICHARDS  1,723,078
DRIVING MECHANISM FOR RAILWAY CAR GENERATORS
Filed March 22, 1927
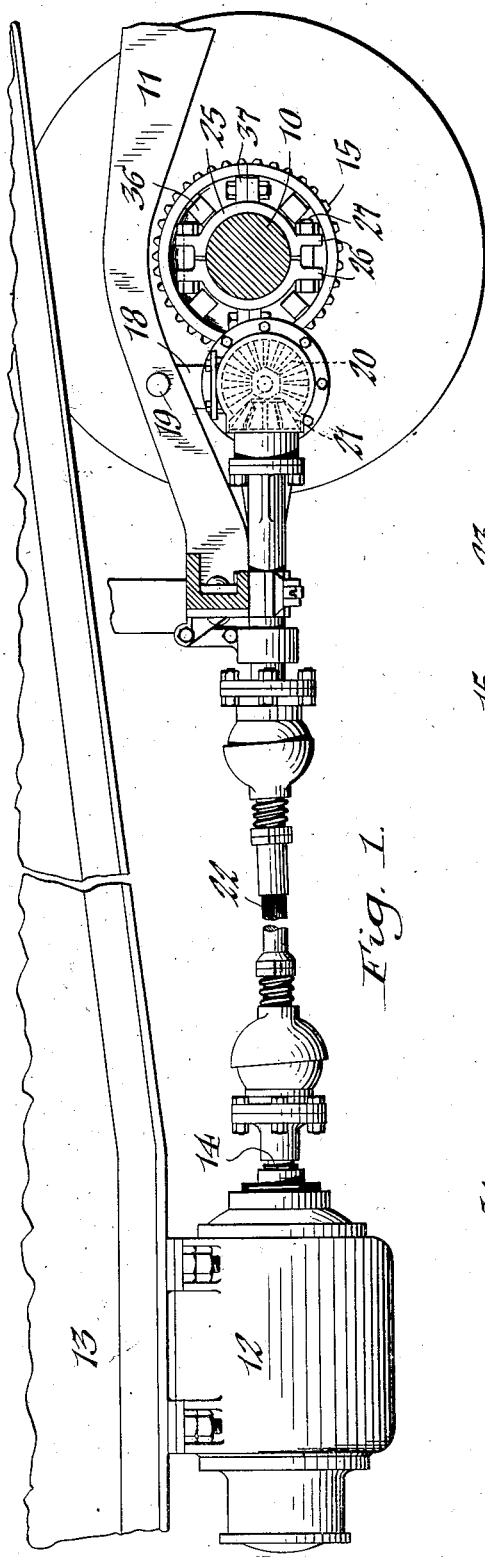
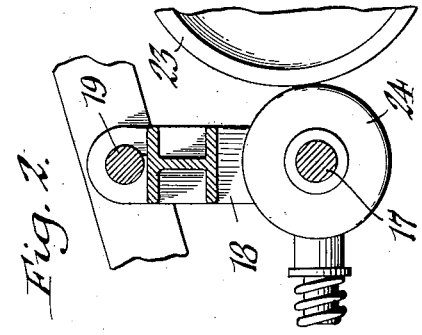
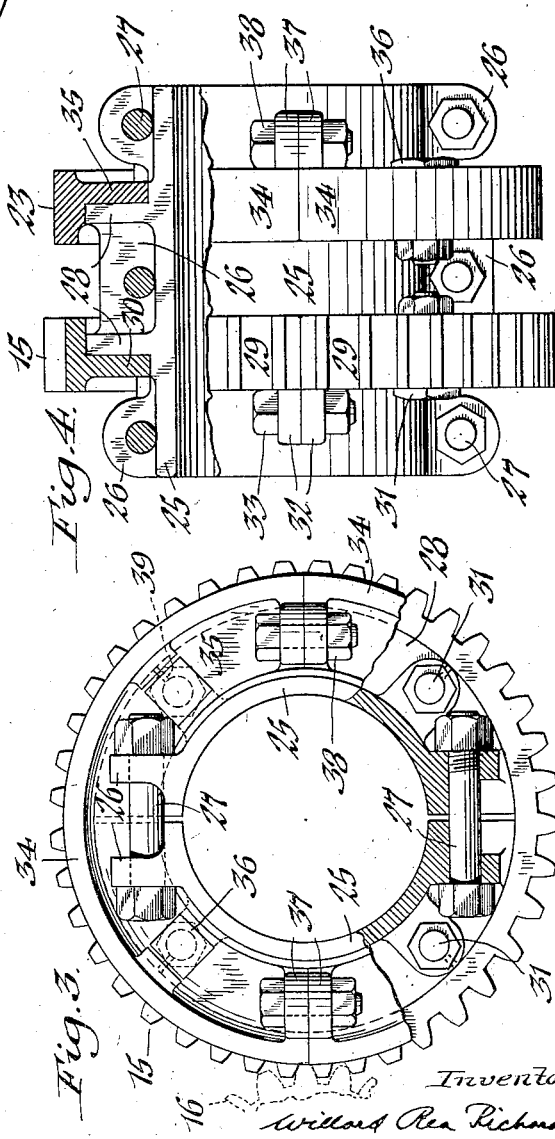

Patented Aug. 6, 1929.

1,723,078

UNITED STATES PATENT OFFICE.

WILLARD REA RICHARDS, OF CHICAGO, ILLINOIS.

DRIVING MECHANISM FOR RAILWAY-CAR GENERATORS.

Application filed March 22, 1927. Serial No. 177,311.

This invention relates generally to the car lighting systems of railway cars and more particularly to improvements in the driving mechanism thereof.

Its principal object is to provide a standard interchangeable and universal demountable driving rim gear having a separable pitch-maintaining rim for obtaining a positive axle drive for such lighting systems.

A further object of the invention is the provision of a driving element of this character which is simple, compact and rugged in construction and whose worn out parts may be readily replaced without disturbing the other parts, thereby affording a material saving in the maintenance of this railway equipment.

In the accompanying drawings: Figure 1 is a side elevation of one type of drive mechanism for the generators employed in connection with car-lighting systems showing my improved driving element applied thereto. Figure 2 is a fragmentary detail view showing the relative position of the distance drums on the axle and driven shaft. Figure 3 is a detached face view of the driving element, partly in section. Figure 4 is a plan view of the same, partly in section.

Similar characters of reference indicate corresponding parts throughout the several views.

By way of example, the invention is illustrated in connection with the type of drive mechanism for generators, shown in my United States Patent No. 1,536,529, dated May 5, 1925, and referring to Fig. 1, 10 indicates the car-axle supported in the usual manner in the truck-frame 11, and 12 indicates the car-lighting generator suitably fastened to the car-body 13 with its armature shaft 14 arranged parallel with the longitudinal axis of the car. Mounted on the axle to turn therewith is a driving member or gear 15 which meshes with a pinion 16 mounted on a shaft 17 journaled in a hanger 18 suspended from a fulcrum pin 19 to swing lengthwise of the car-body in response to any movements of the axle relative to the truck. At one end the driven shaft 17 has a bevel gear 20 which meshes with a similar gear 21 secured to the adjoining end of a propeller-shaft 22 which is joined to the generator-shaft 14. For the purpose of maintaining the pitch circles of the driving gear 15 and pinion 16 in their proper tangential relation, distance drums or wheels 23, 24 are applied to the car axle and driven shaft, respectively, and are kept in rolling contact at all times in the manner fully set forth in the aforesaid patent.

The mounting of the driving gear 15 and its companion distance drums 23 on the axle, which structure constitutes the subject matter of this invention, is preferably constructed as follows:—

25, 25 indicate the sections of a split hub which are provided along their opposing edges with outwardly-facing coupling ears or lugs 26 for receiving clamping bolts 27 by which the hub is reliably fixed to the axle 10. In the arrangement shown in Fig. 4, three sets of such lugs are provided, one set being disposed centrally of the hub and the others at the opposite ends thereof. This hub is designed to detachably support the gear 15 and the distance drum 23 so that each can be readily removed at any time for repair or renewal, and to this end each hub-section 25 has a semi-circular external flange 28 located on either side of the central set of coupling lugs, the latter being joined or cast integral therewith to strengthen the flanges, as seen in Fig. 4. In the assembled position of the hub-sections, their companion semi-circular flanges together form annular flanges. The driving gear is composed of two half sections 29, 29 which encircle one end of the corresponding hub-sections 25, 25 and which are provided with internal attaching rims or flanges 30 engaging the outer side of one of the hub-flanges 28 and secured thereto by fastening bolts 31, which prevent longitudinal displacement of the gear relative to the hub. Extending outwardly from the gear-flanges at the opposing radial edges thereof are coupling ears 32 for receiving clamping bolts 33 which serve to firmly fasten the gear-sections about the hub. Mounted on the other end of the hub-sections is the distance drum, likewise composed of two sections 34, 34 and having internal attaching rims or flanges 35 engaging the outer side of the adjoining hub-flange 28 and secured thereto by bolts 36. Coupling ears 37 formed at the opposing radial edges of the drum-sections and receiving clamping bolts 38 serve to firmly secure the latter to the hub.

As shown in Figs. 3 and 4, the coupling ears 32 and 37 of the gear-sections 29 and distance drum sections 34 respectively, are preferably disposed at right angles to the coupling ears 26 of the hub sections 25, and the fastening bolts 31 and 36 of the gear and drum are located in the spaces between said sets of ears. At the points extending outwardly from the holes through which the fastening bolts 31 and 36 pass, the attaching rims 30 and 35 of the gear and drum are provided with saw cuts or slits 39, indicated by dotted lines in Fig. 3, which permit the sections of such members to yield more or less during the operation of clamping them to the hub.

By this construction, a positive axle drive for the lighting generators of railway cars is provided in which the driving gear and its distance drum or pitch-maintaining rim are universally interchangeable and demountable. As the teeth on the gear become worn, the gear-sections can be easily and quickly replaced without disturbing the fastenings of the hub or the distance drum, and in the same manner the latter may be readily replaced when necessary. While possessing the advantages of simplicity, compactness and ruggedness of construction, the cost of maintenance of this type of railway equipment is reduced to a minimum and the repair of its parts can be quickly effected without taking the cars out of service.

I claim as my invention:—

1. A mounting of the character described, comprising a hub adapted for attachment to an axle and having an outwardly-facing annular attaching flange formed thereon intermediate its ends, a sectional driving member mounted on and encircling said hub and detachably secured to its attaching flange, and coupling ears for receiving clamping bolts formed at the opposing radial edges of the sections of said driving member.

2. A mounting of the character described, comprising a split hub adapted for attachment to an axle and having an outwardly-facing annular flange formed thereon intermediate its ends, a split driving member detachably mounted on the hub in encircling relation to its flange and having an attaching rim arranged alongside said hub-flange and secured thereto, and coupling ears extending outwardly from the opposing radial edges of the sections of said driving member for clamping them together about the hub.

3. A mounting of the character described, comprising a split hub adapted for attachment to an axle and having coupling ears at its ends and intermediate its ends and annular attaching flanges disposed on opposite sides of said intermediate ears, a split driving member detachably mounted at one end of the hub, and a split distance drum mounted on the other end of the hub, the sections of said driving member and said drum having rims secured to the corresponding hub-flanges, and coupling ears extending outwardly from the opposing radial edges of said sections for clamping them together about the hub.

WILLARD REA RICHARDS